United States Patent [19]
Weil

[11] 4,230,835
[45] Oct. 28, 1980

[54] METHOD OF REMOVING POLYBUTADIENE GELS FROM SOLUTIONS

[75] Inventor: Richard C. Weil, Monroeville Borough, Pa.

[73] Assignee: United States Steel Corporation, Pittsburgh, Pa.

[21] Appl. No.: 11,350

[22] Filed: Feb. 12, 1979

[51] Int. Cl. ............................................. C08f 279/02
[52] U.S. Cl. ............................. 525/316; 210/500 M; 210/505
[58] Field of Search ............... 260/880 R; 106/164; 536/60, 61; 210/500 M, 505; 525/316

[56] References Cited

U.S. PATENT DOCUMENTS

| | | | |
|---|---|---|---|
| 3,276,597 | 10/1966 | Mesek | 210/505 |
| 3,452,877 | 7/1969 | Mesek | 210/505 |
| 3,573,158 | 3/1971 | Pall | 210/505 |
| 3,945,976 | 3/1976 | McCurdy | 260/880 R |

Primary Examiner—Paul R. Michl
Attorney, Agent, or Firm—William L. Krayer

[57] ABSTRACT

Solutions of polybutadiene in styrene are filtered through filter media of viscose rayon to remove and/or eliminate gels of sizes greater than about fifty microns.

6 Claims, No Drawings

METHOD OF REMOVING POLYBUTADIENE GELS FROM SOLUTIONS

BACKGROUND OF THE INVENTION

In the manufacture of impact grades of polystyrene, styrene solutions of up to about 10 weight percent polybutadiene are prepared in a dissolving vessel and filtered during or prior to transfer to a polymerization reactor. Solid bales (75 lb or 34 kg) of polybutadiene are cut into small pieces for rapid dissolution, prior to placement in a dissolver. Cold styrene/polybutadiene slurry is heated typically to 140°–180° F. to increase the dissolution rate. After a few hours, i.e. about 1–3 hours or more (grades with the highest rubber content will take longer) the solution is filtered to remove residual polybutadiene gels. These gels swell in styrene, but are not soluble and if not removed will produce visible defects in extruded impact polystyrene sheet. They are not uncommonly as large as 1000 microns in the swollen state.

During polymerization of the styrene solution, conditions are closely controlled to minimize new gel formation because the concentration of gels in a 10-mil extruded sheet of prime product is limited to a specified maximum. Gels may be formed either from styrene homopolymerization or from grafting on the polybutadiene or both. Considerable effort is expended to assure gel removal before polymerization because neither type of gel can be removed after polymerization.

Prior to the present invention, a typical commercial facility would employ a pair of horizontal-plate filters having orifices of up to ½-inch installed in parallel and fitted with one sheet of grade B and one sheet of grade R filter paper for each of 32 plates. In the past, when the pressure drop across the one filter in use reached 50 psi (344 kPa), or the filtration time increased to about 45 minutes, it became necessary to replace the plugged filter paper. Filter changes have been required about every 200 batches with solutions of rubber containing about 10% vinyl groups and about 35% cis groups. Rubbers of very low vinyl content and high (about 98%) cis content are even more likely to contain gels and cause filtering problems. Even with long dissolution times, filtration of only two batches or less of the high-cis solution could require a filter change.

My invention is concerned with the use of a particular filter medium to allow rapid filtering of polybutadiene solution without long dissolution times or frequent filter changes, while still maintaining low gel content in the impact grade of polystyrene made with the polybutadiene.

SUMMARY OF THE INVENTION

My invention provides for the removal of gels from styrene solutions of polybutadiene by passing the solution through filter media of viscose rayon mat or felt having a porosity of from about 15 to 50 microns.

High-cis (98%) polybutadiene having a Mooney viscosity of about 40 (ML-4 at 212° F.) and a 1,2 vinyl content of about 1 was used in a preliminary pilot-plant study. The styrene was a standard purity normally supplied to the pilot plant. All other chemicals used in the tests were from commercial plant supplies.

For the pilot-plant study, the polybutadiene was granulated by using a rubber cutter Model VCM-40 (The Hobart Manufacturing Co.). The rubber particles were added to styrene (at room temperature) being agitated in a 15-gallon (0.056 m$^3$) jacketed vessel (Pfaudler). After being heated at 160° F. (344.3° K.) for the desired time, the resulting rubber solution of about 8% by weight was filtered at 50 psi (344 kPa) through 1.76 square inches (1135.6 mm$^2$) of the selected filter medium housed in a 100-ml pressure filter holder (Millipore Corporation).

During the dissolution study, properties were determined on samples filtered through Eaton-Dikeman 623 filter paper. Viscosities were determined at 160° F. (344.3° K.) with a Cannon-Fenske viscometer; solids contents were determined by evaporating 50-g samples in a vacuum oven (43 mm HG pressure) at 176° F. (353.2° K.).

The normal plant equipment and plant procedures were used during the plant tests to make commercial grades of high impact polystyrene. The Sparkler Filter (UR3232) was equipped with a No. 8 size (33¼-in. or 83 cm diameter with a 3-in.-diameter or 76 mm center hole) Viscose felt with nominal 25-μ openings. A single sheet was used per filter plate (total 64 sheets).

The goal was reduction of both dissolving time and frequency of filter changes with polybutadiene solution while maintaining a low gel count in the product —22 gels per square foot, or less, for prime finished impact polystyrene sheet.

Although gel specifications generally exclude those that can be seen but not felt (usually smaller than 200μ), many impact grades containing high concentrations of visible gels are not used where the ultimate applications cannot tolerate gels. Therefore, all the filter media selected for the initial filtering tests had nominal openings <100μ. Results of these tests showed that the fastest filtering rates were realized with Viscose felts (Table I). Even the slowest rate with Viscose felt was much faster than with the paper used in the plant. Although additional tests showed that the loss in filtering rate with time was less with larger opening sizes of Viscose felt (Table II), it was decided to use a Viscose felt with an opening size of <40μ for further testing (about 40μ is the smallest size particle visible to the naked eye).

TABLE I

Filtering Rates of about 8 Weight Percent Polybutadiene Solution Through Various Filtering Media*

| Filter Medium | Average Filtering Rate,** g/min |
|---|---|
| Eaton-Dikeman 623-70 paper, 4μ (grade B) | 57 |
| Viscon 253 paper, >25μ (grade R) | 187 |
| James River R paper, 25μ | 189 |
| Eaton-Dikeman 939 paper, 50μ | 170 |
| Eaton-Dikeman 933 paper, 5μ | 100 |
| Schleicher & Schnell 520B paper, 50μ | 107 |
| Schleicher & Schnell 478 paper, 30μ | 10 |
| Schleicher & Schnell Shark Skin, 50μ | 25 |
| Viscose Felt, 15μ | 482 |
| Viscose Felt, 25μ | 641 |
| Viscose Felt, 50μ | 743 |
| Viscose Felt, 75μ | 863 |
| Viscose Felt, 100μ | 972 |

*Filtration done at 50 psi and 160° F.
**Test run for 8 minutes.

TABLE II

Filtration of 8 Weight Percent Polybutadiene Solution Through Viscose Felts of Various Openings*

| Nominal Openings, μ | Average Periodic Filtering Rate, g/min | | | |
|---|---|---|---|---|
| | 1 to 2 min | 3 to 4 min | 5 to 6 min | 7 to 8 min |
| 15 | 1339 | 385 | 144 | 64 |

TABLE II-continued

Filtration of 8 Weight Percent Polybutadiene
Solution Through Viscose Felts of Various Openings*

| Nominal Openings, μ | Average Periodic Filtering Rate, g/min | | | |
|---|---|---|---|---|
| | 1 to 2 min | 3 to 4 min | 5 to 6 min | 7 to 8 min |
| 25 | 1498 | 639 | 326 | 182 |
| 50 | 2327 | 1223 | 621 | 344 |

*Filtration done at 50 psi and 160° F.

The pilot-plant study showed a gradual increase in filtering rate with grade B paper as the dissolution time at 160° F. (344.3° K.) was increased (Table III). A similar test with Viscose felt, 25-μ openings, showed that after about four hours dissolution at 160° F. (344.3° K.) the filtering rate did not change appreciably and was about 10 times faster than with grade B paper (Table IV). Measurements of solids contents and viscosities showed that all the soluble polybutadiene had dissolved within four hours.

TABLE III

Effect of Dissolution Time of Polybutadiene on Filtering Rate Through Grade B Filter Paper*

| Time at 160° F., hr | Average Filtering Rate for 8 Min, g/min |
|---|---|
| 3 | 50.9 |
| 4 | 51.0 |
| 5 | 55.3 |
| 6 | 52.3 |
| 7 | 57.9 |
| 8 | 60.3 |

*Filtration done at 50 psi and 160° F.

TABLE IV

Determination of Dissolution Time of Polybutadiene and its Effect on Filtering Rate Through 25-μ Viscose Felt*

| Time at 160° F., hr | Average Filtering Rate For 8 Min, g/min | Filtrate** | |
|---|---|---|---|
| | | Viscosity at 160° F., cKs | Solids Content, wt % |
| 3 | 568 | 265 | 8.01 |
| 4 | 590 | 305 | 8.23 |
| 5 | 624 | 307 | 8.20 |
| 6 | 619 | 305 | 8.25 |
| 7 | 641 | 306 | 8.28 |
| 8 | 624 | | |

*Filtration done at 50 psi and 160° F.
**Sample filtered through Haverhill's Grade B filter paper.

Because of the superior pilot-plant performance of Viscose felt, a 25-μ opening felt was tested under commercial conditions to make a product having 8 weight percent polybutadiene rubber. Dissolution time was initially reduced to four hours at 160° F. (344.3° K.), and was subsequently reduced to 2.5 hours, the normal time for high-polybutadiene-content solutions. Short filtering times, about 18 minutes per batch, and low pressure drops across the filter, about 23 psi (158 kPa), allowed the use of the same filter for the 24 batches observed.

The products averaged 8 gels per $ft^2$ and were within the gels specification for prime grade.

Tests run with low cis-polybutadiene showed that over 1,000 batches of solution could be filtered within the allowable pressure drop and filtering time while subsequently making low gel impact polystyrene.

I may use any viscose rayon felt. As is known in the filter art, the opening dimensions are usually determined and standardized by means of glass spheres of given sizes and tolerances. My filter media have pore openings of sizes preferably standardized by the use of glass spheres of 15 to 50 microns. Satisfactory sheets are typically available in $\frac{1}{8}''$ thicknesses—however, the thickness is not particularly important although the specifications of the filter supporting parts may limit the thickness (or thinness) as it affects the seal. The sheets should be supported on perforated plates or screens having orifices of up to about $\frac{1}{2}''$ depending on the pressures used.

The most significant effect of my invention is that gels which normally, with other filter media, would plug up the pores or form an impregnable layer on top of the medium after one or two uses, seem actually to disintegrate and/or to dissolve. While I do not intend to be restricted to any theories or proposed mechanisms of my invention, it may be speculated that this effect is due either to the resiliency, i.e. the ability of the medium to retain its pore size, or to its relatively large surface area which results in an attritional effect aiding in the dissolution of the butadiene polymer. The viscosity of the solution may vary up to 3200 cps at 150° F.

My invention is not restricted to the above specific examples and illustrations. It may be otherwise practiced within the scope of the following claims.

I claim:

1. Method of removing gels from a solution of polybutadiene in styrene comprising passing the solution through a filter medium of viscose rayon felt.

2. Method of removing gels from successive solutions of about 5% to about 10% polybutadiene in styrene comprising passing said solutions through a filter medium of viscose rayon felt having an average pore size of about 15 to about 50 microns.

3. Method of claim 2 wherein the filter medium is supported on a plate or screen having a plurality of orifices larger than the pore size of the filter medium and up to about one-half inch.

4. Method of claim 2 in which the solution is passed through the filter medium under a pressure of from about 10 to about 100 psig.

5. Method of making a gel-free, high-impact polystyrene comprising cutting a polybutadiene rubber into small pieces, dissolving it in styrene to form a solution containing about 5% to about 10% polybutadiene, filtering said solution through a filter of viscose rayon felt, and polymerizing the styrene.

6. Method of claim 5 wherein the viscose rayon felt filter has pore sizes of from about 15 to about 50 microns.

* * * * *